United States Patent [19]

Smith et al.

[11] Patent Number: 4,960,383

[45] Date of Patent: Oct. 2, 1990

[54] DISPLAYBOARDS

[75] Inventors: Brian D. Smith; Nigel T. Court; Christopher G. Howsam, all of London, United Kingdom

[73] Assignee: International Tutor Machines, Limited, Hampshire, England

[21] Appl. No.: 294,419

[22] Filed: Jan. 9, 1989

[30] Foreign Application Priority Data

Jan. 13, 1988 [GB] United Kingdom ................. 8807008

[51] Int. Cl.[5] ................................................ G09B 1/06

[52] U.S. Cl. ....................................... 434/430; 434/365

[58] Field of Search ........................ 434/428, 420, 365; 40/605, 610, 361, 622, 621

[56] References Cited

U.S. PATENT DOCUMENTS

| | | | |
|---|---|---|---|
| 3,608,221 | 9/1969 | Harris | 40/605 |
| 3,812,600 | 5/1974 | Rondello | 434/480 |
| 3,842,347 | 12/1974 | Reibold | 40/622 |
| 4,040,194 | 8/1977 | Penton et al. | 40/621 |
| 4,527,347 | 7/1985 | Ohlson | 40/361 |
| 4,654,101 | 3/1987 | Kane | 40/621 X |
| 4,669,210 | 6/1987 | Van Erum | 40/622 X |

FOREIGN PATENT DOCUMENTS

| | | | |
|---|---|---|---|
| 2039119 | 7/1980 | United Kingdom | 40/605 |

*Primary Examiner*—Richard J. Apley
*Assistant Examiner*—Rachel M. Healey
*Attorney, Agent, or Firm*—Shoemaker and Mattare, Ltd.

[57] ABSTRACT

A displayboard comprises sheets with a plastics foam core formed in situ between them. Edging strips having internal channels in which the edges of the board lie are mechanically connected directly to the sheets either by tongues that project out of the sheets into recesses in the sides of the channels or by the pressure of the foam core when being formed forcing parts of the sheets into the recesses. The edging strips have external channels serving auxiliary functions, e.g. securing the displayboard to wall brackets, securing a hinge joining a second displayboard, securing a pencil tray and carrying a pelmet containing a spring-loaded clamp for clamping papers against the edging strip.

10 Claims, 3 Drawing Sheets

DISPLAYBOARDS

This invention relates to an improved displayboard.

DESCRIPTION OF THE PRIOR ART

It is known to make a displayboard from a pair of sheets with a core sandwiched between them and surrounded by an edging strip, and it is an object of the invention to provide a displayboard structure of this kind which combines improved strength with low weight and manufacturing cost.

SUMMARY OF THE INVENTION

According to one aspect of the invention, a board comprises a pair of sheets sandwiching a core, preferably a plastics foam core formed in situ, with edges of the sheets fitting into an edging strip of channel section, wherein internal hollows or recesses formed along the sides of the channel section are held interlocked with tongues formed in lines adjacent the edges of the sheets to mechanically connect the edging strips with the sheets. Where a less robust form of board is required sufficient strength is imparted by the retaining lips of the channel section gripping the sheets which within the channel section will have been forced outwards by the foam to greater width than that between the retaining lips.

Foam sandwich panels with edging strips are known, e.g. for use in garage doors, but the edging strip is connected to the foam core and not to the panels which is less strong and wear resistant e.g. when used in a school blackboard which must be capable of withstanding abuse by pupils. A mechanical connection between the edging strip and the core e.g. by means of a dovetail joint may also be provided in this invention.

In a second aspect the invention provides a top rail for a displayboard having an integral pelmet structure supporting a cam that hinges between paper-gripping and paper-release positions, wherein the top of the pelmet structure is offset above an external channel of the top rail and the hinge position and dimensions of the cam are such that it acts against portions of the top rail and not against the displayboard.

The cam may be a plastics or aluminum extrusion having a biasing spring extending full length therealong and may be divided into a number of sections inserted into the pelmet structure in side-by-side relationship so that objects such as sheets and pads of different thicknesses may be gripped simultaneously at different positions. In one form where the cam is of plastics material the hinge itself may form the spring.

In a third aspect of the invention, the edging strip has an external channel bounded by return portions defining a narrowed slit therebetween, and a cover strip may be fitted into the channel so as to overlie the edging strip, the cover strip having ribs inclined at a small angle towards one another and terminating at outturned barbs, insertion of grub screws into apertures along the cover strip forcing the ribs apart and jacking the cover strip away from the edging strip until the expanded barbs butt against the return portions.

The cover strip may be part of a hinge structure joining a pair of displayboards as aforesaid, or may be used to attach other implements or fittings to be used in conjunction with the displayboard, such as light fittings.

DESCRIPTION OF THE DRAWINGS

Various embodiments of the invention will now be described, by way of example only, with reference to the accompanying drawings, in which.

DESCRIPTION OF A PREFERRED EMBODIMENT

Figure 1A:
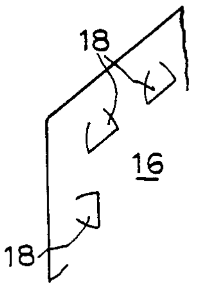
FIG. 1*a* is a perspective view of a detail of the display board.
Figure 9:
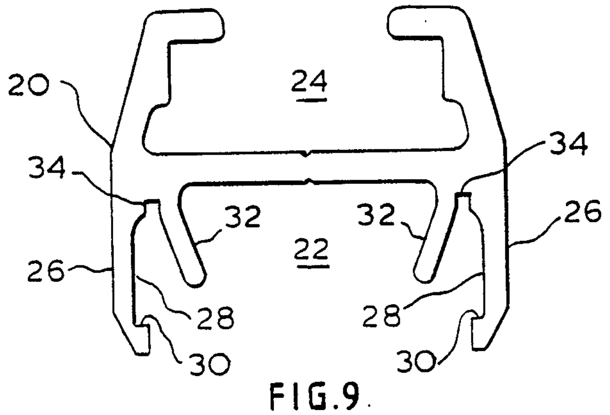
FIG. 9 is a diagram of an edging extrusion that forms part of the displayboard of FIG. 1.

In the drawings, a wall hung displayboard consists of a central panel 10 and side panels 12 hinged together about vertical axes by means of hinges 14. The structure of the panels 10,12 is similar. They each have a pair of facing sheets 16,17 of enamelled, painted, prefinished or finished metal or of a plastics laminate such as Formica which are formed about their edges with lines of outwardly projecting tongues 18 (FIG. 1*a*) which are spaced about 1 cm inwards from a respective edge. The sheets 16,17 fit into a frame made of edging strip 20, 20*a*, 20*b* that has an internal channel 22 and an external channel 24 (FIG. 9). The internal channel is bounded by cheeks 26 formed on their inner faces by recesses 28. The outer ends of the recesses 28 are sharply angled at 90 degrees to define retaining lips 30 and the inner ends of the recesses 28 are separated from inwardly inclined depending ribs 32 by small spaces 34. Thus the edging strip may pass onto a sheet 16 or 17 over the lines of tongues 18 until its edge locates into the respective space 34 trapping the tongues 18 in the recess 28. But provided that the sheet 16 or 17 is prevented by a core structure of the panel from deforming inwardly, the tongues 18 remain trapped within the recess 28. As a result the edging strip 20 is held onto the sheet 16 or 17, and there is a load-transmitting mechanical interlock between the sheet 16 or 17 and the strip 20. In the less robust form where no tongue is used foam forces (as described below) the edges of the two sheets to deform outwards into the recesses formed by the retaining lips 30 inside the channel thus preventing the greater width to be pulled through the narrow space between the retaining lips.

To make a panel 10 or 12 the sheets 16,17 are laid up in a jig at a separation defined by suction or magnetic pads in the jig or by blocks of wood or other suitable material located between the sheets. Edging strips 20 are pushed onto the edges of the sheets so that the tongues 18 latch into the recesses 28 or (particularly when using plastics laminate sheets) slid on endwise, conveniently with plastics corner pieces joining the strips 20 which extend along the sides of the panel, after which both sheets are externally supported and a two-component plastics foam mixture is injected through an aperture in one of the strips 20 into the space between the sheets. The mixture falls to the bottom of the cavity and then rises to fill the cavity with foam 36 which presses sheets 16,17 outwardly against confining walls of the jig and forms with said skins a rigid sandwich structure. Foam enters the space between ribs 32 to form a dovetail connection with the edging strip 20, but more significantly it fills the regions between the outer faces of ribs 32 and the inner faces of sheets 16,17 and deform them outwardly so that the mechanical connection referred to previously is maintained. The resulting structure is both inexpensive to make and of substantial strength because loads can be taken through the sheets 16,17 and not simply through the foam 36.

Figure 1:
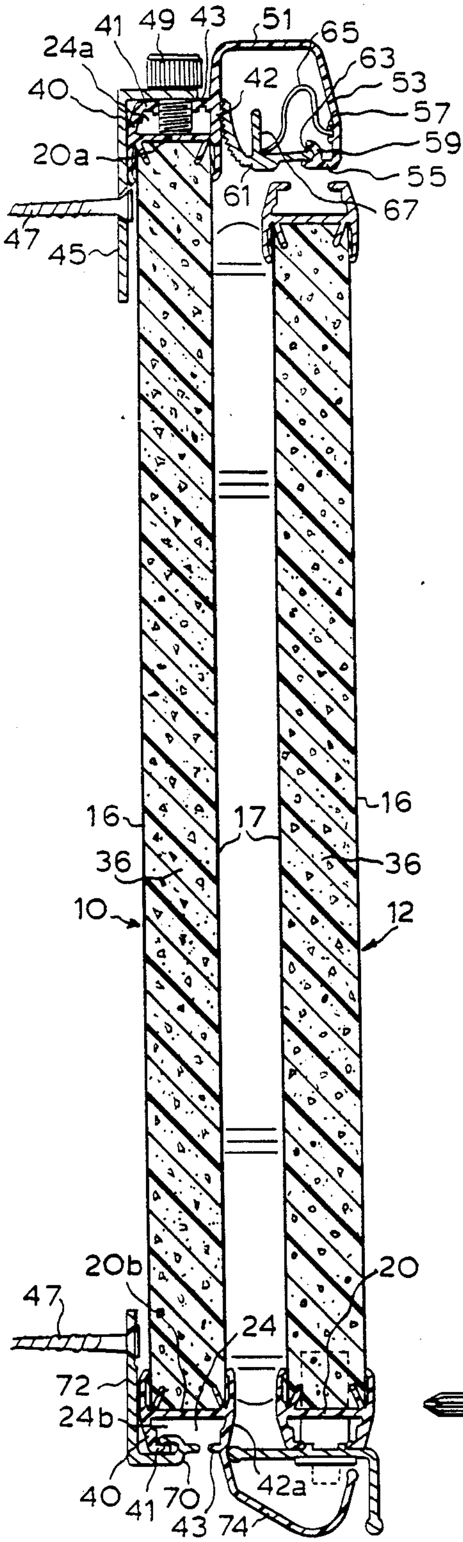
FIG. 1 is a view in vertical section of a wall mounted displayboard according to the invention made in three panels hinged together about vertical axes.
Figure 1:
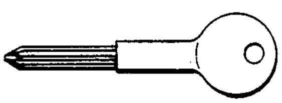
Figure 2:
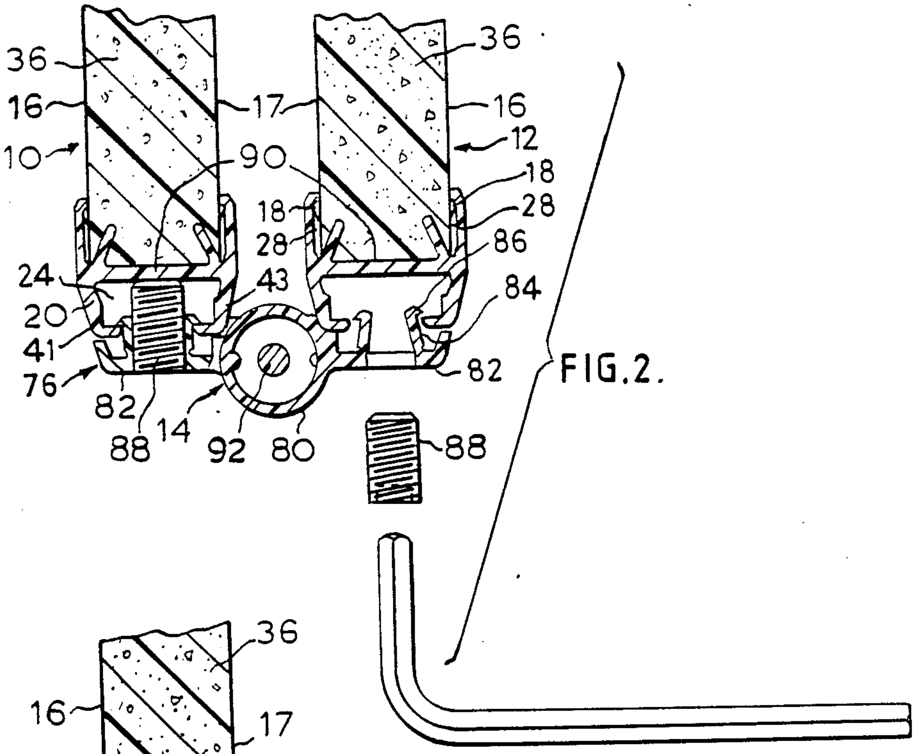
FIGS. 2 and 3 are diagrammatic fragmentary horizontal sections of two of the displayboard panels in the region of a hinge joining them, FIG. 2 showing the panels in the folded state and FIG. 3 showing them in the extended state.
Figure 3:
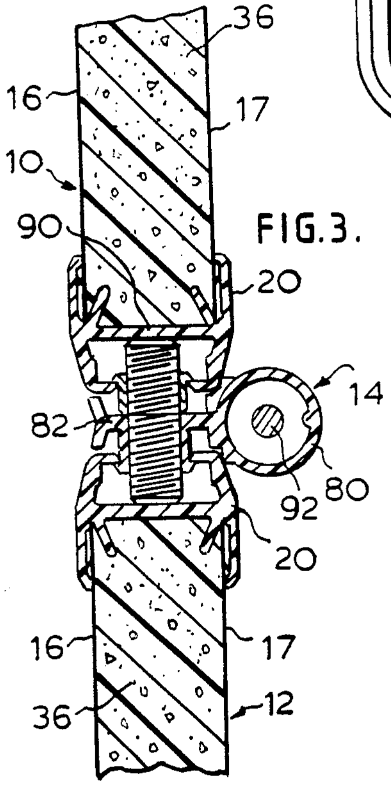

As is apparent from FIGS. 1 and 2, the edging strips to the top and bottom of the displayboard central panel 10 can be different in profile from those on the side panels 12 and on the side edges of the central panel 10, the differences occurring in the external channels 24, 24a, 24b. It will be appreciated that all three sections can readily be made as extrusions in aluminum or a plastics material such as PVC or the like.

The top edge strip 20a has two extra functions. It provides a female connection by which the panel 10 is held upright and it is formed with an integral paper support. Thus the external channel 24a is bounded by upstanding outer flanges 40,42 and by return portions 41,43 between which is defined a slot. The panel 10 is supported along its top edge by an angle bracket 45 attached to the wall by screws 47 or other suitable means. The top limb of the bracket 45 carries cap screws 49 that locate into the top rail slot to hold the top edge upright. The flange 42 is continued above the return portion 43 to support an upwardly offset paper-retaining pelmet structure defined by a top wall 51, and a front wall 53 terminating at a returned lip 55. The inner face of front wall 53 has a pair of closely spaced ribs 57. The lip 55 terminates at a C-profile socket formation 59. A rigid cam-like paper clamping member 61 of generally curvilinear or J-shaped profile has a ball formation 63 that fits into the socket 59. It will be noted that the curvature tightens towards the pivoting center line so that a clamp face offered to paper sheets or to a pad being clamped remains substantial even when a relatively thick pad is being clamped. The hinge joint resulting from the ball formation 63 and socket formation 59 allows the member 61 to pivot towards or away from the inner flange 42 towards which member 61 is urged by a spring 65 that is in compression between rib 67 of the member 61 and the pair of ribs 57 on the front wall 53. The member 61 may be pushed up by hand to allow a single paper sheet, a number of sheets or a pad to be inserted and retained between it and the inner flange 42. It will be noted that the edging strip and the pelmet structure are combined into a single extrusion in the form above described, and that the clamping member 61 bears against a portion 42 of the edging strip 20 rather than against part of the panel 10, which provides more usable surface for the panel 10 and gives the member 61 a smoother flatter surface to act against.

The bottom edging strip 20b has outer flange 40 and return portion 41 that are an endwise sliding fit in a slot formation 70 of a bottom bracket 72 screwed to the wall by further screws 47. The weight of the panel 10 is supported on the bracket 72, the bracket 45 and cap screws 49 simply preventing it from pivoting outwards away from the wall. A second flange is continued beneath return portion 43 to define a receiving tray 74 for writing instruments.

Figure 4:
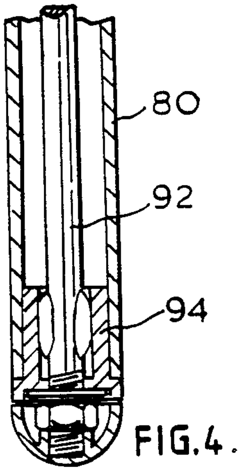
FIGS. 4 and 5 are respectively a vertical and a horizontal section of the hinge.
Figure 5:
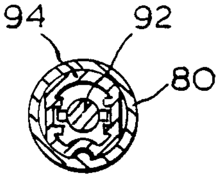

The side edging section 20 of the center panel 10 is the same as the edging strip used all around the side panels. The cover strip means 76 accommodates a barrel hinge 14 interconnecting the panels as more particularly shown with reference to FIGS. 2–5. The hinge 14 is formed in two halves, each of an identical extrusion comprising a circular body 80 and a flange 82 extending therefrom. The flange 82 is formed with a pair of inwardly inclined ribs 84 terminating in outwardly facing barbs 86. The ribs 84 in their undeformed state (right hand side of FIG. 2) fit into the slot defined between return portions 41, 43. Holes are drilled at intervals along the flange 82 to accept grub screws 88 that when inserted into the apertures expand the ribs 84 so that their barbs 86 are trapped behind the return portions 41, 43 and cannot be pulled straight out of the external channel 24. Continued tightening of grub screws 88 causes them to contact the web portion 90 of the edging strip 20, jacking the flange 82 outwards until the barbs 86 abut the return portions 41, 43. As a result the flange 82 is held by friction against being pulled out endwise, and play between the flange 82 and the edging strip 20 is avoided. The circular body 80 of adjacent hinge extrusions is cut to form short inter-digitated portions that are held together by means of a tension rod 92 and molded bearing 94 (FIGS. 4 and 5). The advantage of the hinge structure illustrated is that the ribs 84 are expanded so that the barbs 86 make line contact with the return portions 41, 43, which would have to be burst outwards before the panel 12 could be pulled off the panel 10.

Figure 6:
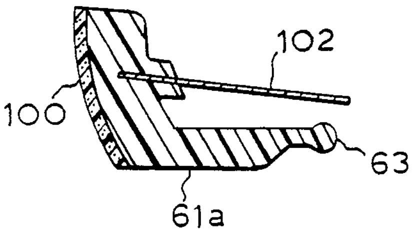
FIGS. 6–8 are sections of three different forms of a cam extrusion that can be used as part of the displayboard of claim 1.
Figure 7:
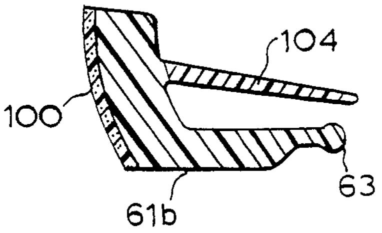
Figure 8:
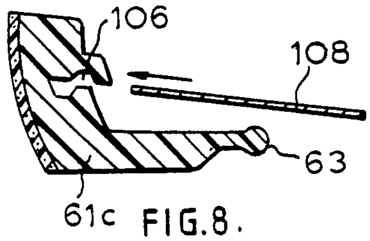

FIGS. 6–8 show alternative forms of the clamping member 61. In FIG. 6, the member 61a is extruded in hard PVC with a face remote from the ball 63 formed with a layer of soft sticky PVC for maximum friction and with a blade 102 of spring steel molded into the extrusion and running the full length. The PVC extrusion is more flexible than an equivalent aluminum extrusion and may be in one piece or cut into a number of lengths that are inserted side by side into the pelmet structure of top rail 20a. In this way, single sheets may be supported at one position along the top rail 20a and a pad of paper may be supported side-by-side at another position along the top rail 20a. The member 61b of FIG. 7 is similar except that the blade 102 is replaced by a molded-in blade 104 of springy PVC. The member 61c is again similar except that it is formed with a socket 106 into which a spring steel blade 108 is a push fit.

It will be appreciated that various modifications may be made to the embodiments described above without departing from the invention. For example, the board may consist of only a single panel, the outer panels 12 being dispensed with. The soft sticky PVC 100 on the cam rail may be replaced with a series of sharp serrations extruded into the clamping face. The flange 82 can be extruded to take o form different accessories to be attached to the board such as lights or trays for pencils.

We claim:

1. A displayboard comprising two substantially coextensive spaced sheets formed with straight edges and each having appreciable tensile strength, core material separating and filling the space between said sheets, said core material having less tensile strength than said sheets and each said sheet being formed with lines of tongues projecting away from said core, the lines extending parallel to and comparatively close to edges of said sheet, and channel section edging strips shaped to fit over the edges of said sheets separated by said core material and formed with flanges engaging respectively outer faces presented by said two sheets and formed with recesses receiving said tongues, said recesses and said tongues being shaped mechanically to connect said edging strips with said sheets, upon filling said space between the said sheets with said core material.

2. A displayboard according to claim 1, in which said core material is a plastics foam formed in situ between said sheets from a mixture inserted between said sheets when mounted in spaced relationship.

3. A displayboard comprising two substantially coextensive flexible spaced sheets having appreciable tensile strength, solid core material separating and filling the space between said sheets, said core material having less tensile strength than said sheets, and channel section edging strips shaped to fit over the edges of said sheets when separated by said core material and formed with flanges engaging outer faces presented respectively by said two sheets and formed with recesses, said core material being a plastics foam formed in situ between said sheets from a mixture which in the formation of said foam presses portions of said sheets into said recesses thereby mechanically connecting said edging strips and said sheets.

4. A displayboard according to claim 3, in which each said channel section edging strip is formed internally with a pair of spaced longitudinal ribs converging towards one another in the direction of the open portion of said channel section and into said foam core material to define a dovetail joint.

5. A displayboard comprising two substantially coextensive spaced rectangular sheets formed with straight edges and each having appreciable tensile strength, core material consisting of a plastics foam formed in situ between said sheets to separate and fill the space between said sheets and having less tensile strength than said sheets, channel section edging strips shaped to fit over and along top, bottom and side edges of said sheets separated by said core material and formed with flanges engaging respectively outer faces presented by said two sheets and formed with recesses facing said sheets, said sheets being formed with portions thereof that are pressed into said recesses by the formulation of said foam thereby mechanically connecting said edging strips and said sheets, a pelmet structure integral with said top edging strip extending above and outwards away from one face of said board so as to define an inverted channel parallel with said top edge, a clamping member hingedly mounted within said pelmet structure about an axis parallel to said top edge to move between a position in which it can grip the top edge of a paper between itself and said edging strip and a position in which it releases such paper, and a spring mounted to act between said pelmet structure and said clamping member for biasing said clamping member to its paper gripping position.

6. A displayboard according to claim 5, in which said clamping member is formed as an extrusion and extends substantially the full length of said pelmet structure and in which said spring means consists of a leaf spring fixed along said clamping member.

7. A displayboard according to claim 5, in which said clamping member is divided into a number of sections hingedly mounted in side-by-side relationship along said pelmet structure whereby sheets and pads of different thicknesses may be gripped simultaneously along said edging strip, said spring means being arranged to act individually on said clamping member sections.

8. A displayboard comprising a rigid board formed with at least one straight edge, an edging strip fixed along said straight edge, said edging strip being formed with an external channel defined by a base extending along said edge and outstanding parallel flanges terminating in inturned portions defining a narrowed slit therebetween, a functional cover strip extending along and covering said external channel, said cover strip being formed therealong with ribs extending through said narrowed slit having been initially inclined at a small angle towards one another, said ribs terminating at out-turned barbs, and said cover strip being further formed with apertures located between said ribs, and grub screws respectively inserted into said apertures whereby said ribs are forced apart and said cover strip is jacked away from said edging strip so that said barbs butt against said inturned portions.

9. A displayboard according to claim 8, in which said functional cover strip comprises part of a hinge structure for joining the displayboard to a second displayboard edge to edge.

10. A displayboard according to claim 8, in which said functional cover strip comprises a tray extending therealong for pencils and the like.

* * * * *